US006980801B1

(12) United States Patent
Soininen et al.

(10) Patent No.: US 6,980,801 B1
(45) Date of Patent: Dec. 27, 2005

(54) SELECTION MOBILITY AGENT IN ACCESS NETWORK

(75) Inventors: Jonne Soininen, Mountain View, CA (US); Ahti Muhonen, Hirvihaara (FI)

(73) Assignee: Nokia Corporation, Espoo (FI)

( * ) Notice: Subject to any disclaimer, the term of this patent is extended or adjusted under 35 U.S.C. 154(b) by 403 days.

(21) Appl. No.: 09/980,781

(22) PCT Filed: Jun. 6, 2000

(86) PCT No.: PCT/FI00/00504

§ 371 (c)(1),
(2), (4) Date: Dec. 6, 2001

(87) PCT Pub. No.: WO00/76234

PCT Pub. Date: Dec. 14, 2000

(30) Foreign Application Priority Data

Jun. 7, 1999 (FI) .................................. 991297

(51) Int. Cl.[7] .............................................. H04Q 7/20
(52) U.S. Cl. ................ 455/435.1; 455/433; 455/432.1; 455/445; 370/228; 370/328; 370/329; 370/331; 370/338; 370/401; 709/220; 709/222; 709/223; 709/224; 709/225
(58) Field of Search ........................... 455/445, 435.1, 455/432.1, 436, 439, 433; 370/338, 349, 370/352–356, 278, 328, 329; 709/220, 222

(56) References Cited

U.S. PATENT DOCUMENTS 5,793,762 A    8/1998  Penners et al.
6,104,929 A *  8/2000  Josse et al. ................. 455/445
6,137,791 A * 10/2000  Frid et al. ................... 370/352
6,151,495 A * 11/2000  Rune ....................... 455/426.1
6,195,705 B1 * 2/2001  Leung ........................ 709/245
6,256,300 B1 * 7/2001  Ahmed et al. .............. 370/331
6,442,616 B1 * 8/2002  Inoue et al. ................ 455/433
6,606,501 B1 * 8/2003  Saha et al. .................. 342/450
6,622,016 B1 * 9/2003  Sladek et al. ............. 455/414.1
6,628,943 B1 * 9/2003  Agrawal et al. .......... 455/432.1
6,643,511 B1 * 11/2003  Rune et al. ................. 455/433
6,711,147 B1 * 3/2004  Barnes et al. .............. 370/338
6,725,038 B1 * 4/2004  Subbiah ..................... 455/436
2003/0190915 A1 * 10/2003  Rinne et al. ................ 455/436

FOREIGN PATENT DOCUMENTS

WO       WO 8943446          10/1998
WO       WO 9843446  A2 *    10/1998
WO       WO 98/59468         12/1998

* cited by examiner

Primary Examiner—William Trost
Assistant Examiner—Sharad Rampuria
(74) Attorney, Agent, or Firm—Pillsbury Winthrop Shaw Pittman LLP

(57) ABSTRACT

In an access network which supports macro mobility management, an access node checks during an attach procedure of a mobile station whether the mobile has macro mobility capability, i.e., whether there is a potential need for a macro mobility services. If there is no macro mobility capability, a normal attach procedure is preformed. However, if there is macro mobility capability, the access node selects a suitable mobility entity to the mobile station, sends the identity of the selected mobility entity to the mobile station and requests the initiation of a packet protocol context activation in the system.

20 Claims, 2 Drawing Sheets

SELECTION MOBILITY AGENT IN ACCESS NETWORK

This is the U.S. National Stage of International Application PCT/FI00/00504 which was filed on Jun. 6, 2000 and published in the English language.

FIELD OF THE INVENTION

The invention relates to a mechanism for the selection of a mobility agent for routing of higher protocol layer traffic, such as an Internet-type protocol traffic, in an access network.

BACKGROUND OF THE INVENTION

Mobile communications system refers generally to any telecommunications system which enables a wireless communication when users are moving within the service area of the system. A typical mobile communications system is a Public Land Mobile Network (PLMN). Often the mobile communications network is an access network providing a user with a wireless access to external networks, hosts, or services offered by specific service providers.

The general packet radio service GPRS is a new service in the GSM system (Global System for Mobile Communication). A subnetwork comprises a number of packet data service nodes SN, which in this application will be referred to as serving GPRS support nodes SGSN. Each SGSN is connected to the GSM mobile communication network (typically to a base station controller BSC or a base station BTS in a base station system) so that the SGSN can provide a packet service for mobile data terminals via several base stations, i.e. cells. The intermediate mobile communication network provides radio access and packet-switched data transmission between the SGSN and mobile data terminals. Different subnetworks are in turn connected to an external data network, e.g. to a public switched data network PSPDN, via GPRS gateway support nodes GGSN. The GPRS service thus allows to provide packet data transmission between mobile data terminals and external data networks when the GSM network functions as a radio access network RAN.

Third generation mobile systems, such as Universal Mobile Communications system (UMTS) and Future Public Land Mobile Telecommunications system (FPLMTS), later renamed as IMT-2000 (International Mobile Telecommunication 2000), are being developed. In the UMTS architecture, a UMTS terrestrial radio access network, UTRAN, consists of a set of radio access networks RAN (also called radio network subsystem RNS) connected to the core network (CN). Each RAN is responsible for the resources of its set of cells. For each connection between a mobile station MS and the UTRAN, one RAN is a serving RAN. A RAN consists of a radio network controller RNC and a multiplicity of base stations BTS. One core network which will be using the UMTS radio access network is the GPRS.

One of the main targets in the development of mobile communication networks is to provide an IP (Internet Protocol) service with a standard IP backbone which would use a combination of a Mobile IP and mobile network mobility management in the mobile networks. The basic IP concept does not support the mobility of the user: IP addresses are assigned to network interfaces in dependence on their physical location. In fact, the first field of an IP address (the NETID) is common to all interfaces that are linked to the same Internet subnet. This scheme prevents the user (the mobile host) from keeping its address while moving over different Internet subnets, i.e. while changing the physical interface.

In order to enhance mobility in the Internet, a Mobile IP protocol for IP version 4 has been introduced by the Internet Engineering Task Force (IETF) in the standard RFC2002. A Mobile IP enables the routing of IP datagrams to mobile hosts, independently of the point of attachment in the subnetwork. The Mobile IP protocol introduces following new functional or architectural entities.

'Mobile Node MN' (also called Mobile Host MH) refers to a host that changes its point of attachment from one network or subnetwork to another. A mobile node may change its location without changing its IP address; it may continue to communicate with other Internet nodes at any location using its (constant) IP address. 'Mobile Station (MS)' is a mobile node having a radio interface to the network. 'Tunnel' is the path followed by a datagram when it is encapsulated. The encapsulated datagram is routed to a known decapsulation agent, which decapsulates the datagram and then correctly delivers it to its ultimate destination. Each mobile node is connected to a home agent over a unique tunnel, identified by a tunnel identifier which is unique to a given Foreign Agent/Home Agent pair.

'Home Network' is the IP network to which a user logically belongs. Physically, it can be e.g. a local area network (LAN) connected via a router to the Internet. 'Home Address' is an address that is assigned to a mobile node for an extended period of time. It may remain unchanged regardless of where the MN is attached to the Internet. Alternatively, it could be assigned from a pool of addresses.

'Mobility Agent' is either a home agent or a foreign agent. 'Home Agent HA' is a routing entity on a mobile node's home network which tunnels packets for delivery to the mobile node when it is away from home, and maintains current location information for the mobile node. It tunnels datagrams for delivery to a mobile node, and, optionally, detunnels datagrams from it, when the mobile node is away from home. 'Foreign Agent FA' refers to a routing entity in a mobile node's visited network which provides routing services to the mobile node while registered, thus allowing a mobile node to utilise its home network address. The foreign agent detunnels and delivers packets to the mobile node that were tunnelled by the mobile node's home agent. For datagrams sent by a mobile node, the foreign agent may serve as a default router for registered mobile nodes.

RFC2002 defines 'Care-of Address' (COA) as the termination point of a tunnel toward a mobile node, for datagrams forwarded to the mobile node while it is away from home. The protocol can use two different types of care-of addresses: a "foreign agent care-of address" is an address announced by a foreign agent with which the mobile node is registered, and a "co-located care-of address" is an externally obtained local address which the mobile node has acquired in the network. An MN may have several COAs at the same time. An MN's COA is registered with its HA. The list of COAs is updated when the mobile node receives advertisements from foreign agents. If an advertisement expires, its entry or entries should be deleted from the list. One foreign agent can provide more than one COA in its advertisements. 'Mobility Binding' is the association of a home address with a care-of address, along with the remaining lifetime of that association. An MN registers its COA with its HA by sending a Registration Request. The HA replies with a Registration Reply and retains a binding for the MN.

A single generic mobility handling mechanism that allows roaming between all types of access networks would allow the user to conveniently move between fixed and mobile networks, between public and private networks as well as between PLMN's with different access technologies. Therefore, mechanisms supporting the Mobile IP functionality are being developed also in mobile communication systems, such as UMTS and GPRS.

It is desired that the Mobile IP will be implemented as an overlay of the UMTS/GPRS network while maintaining backwards compatibility with present systems, assuming minimal modifications in the GPRS standards and on networks whose operators do not want to support the MIP. FIG. 1 illustrates the minimum configuration for a GPRS operator who wishes to offer the mobile IP service. The current GPRS structure is kept and it handles the mobility within the PLMN, while MIP allows the user to roam between other systems, such as LAN's, and the UMTS without loosing an ongoing session. In FIG. 1 the foreign agents FA are located at GGSN's. All GGSN's may not have FA's. The SGSN and the GGSN may also be co-located. One FA in a PLMN is sufficient for offering MIP service, but for capacity and efficiency reasons, more than one FA may be desired. This means that the MS must request a PDP context to be set up with a GGSN that offers FA functionality. While setting up the PDP context, the MS is informed about network parameters of the FA, e.g. the care-of address.

The problem is to know whether the SGSN has an associated GGSN with Foreign Agent (FA) capabilities and to open a PDP address to the correct one of several FAs, such as the nearest one.

Similar problems may be encountered in any mobility management and routing on a system level overlaying the mobility management of an access network. These various overlaying mobility managements are commonly referred to as macro mobility management herein.

SUMMARY OF THE INVENTION

An object of the present invention is to overcome or alleviate the above described problems.

The object is achieved with a method, a system and an access node characterized by what is disclosed in the attached independent claims. Preferred embodiments of the invention are disclosed in the attached dependent claims.

In the present invention a support node, or more generally any access node, checks preferably during an attach procedure of a mobile station whether the mobile concerned has macro mobility capability, i.e. whether a potential need for a mobility entity or a macro mobility capability can be assumed. Mobility entity may be any entity which provides a point of attachment on the macro mobility level, such as a mobility agent in the mobile IP type mobility management. If there is no mobility capability, a normal attach procedure is performed. However, if there is a macro mobility capability, the access node selects a suitable mobility entity to the mobile station and sends the identity of the selected mobility entity to the mobile station in association with an access context establishment. The access context establishment may be, for example, the creation of a packet protocol (PDP) context, and the access node may request the mobile station to initiate an activation of a packet protocol (PDP) context in the system. The mobility entity identity is preferably sent in the PDP context activation request so that no extra message is required. Also other mobility entity attributes may be sent to the mobile station. If the mobile station really is interested in using the macro mobility, it performs a PDP context activation immediately so that a connection is set up to the selected mobility entity.

In the preferred embodiment of the invention the macro mobility management is Mobile IP type mobility management. A typical feature of the mobility agent in the Mobile IP is that it periodically transmits agent advertisement messages to the mobile nodes in order to advertise its services. The mobile nodes use these advertisements to determine the current point of attachment to the Internet. The connection established to the selected mobility agent allows the agent advertisement messages sent by the selected mobility agent to be received by the mobile node, and thereby the mobile node is able to initiate a standard mobile IP registration.

In an embodiment of the invention, when the mobile station is not interested in using the macro mobility, e.g. because it has no associated mobile node (e.g application or device using mobile IP) at the moment, it may ignore the PDP activation request. The mobile station may further store the received mobility entity information to be used later. When the mobile station at a later stage wishes to make the registration according to the specific macro mobility management, it can the use the stored information.

The selection of the mobility entity may be based on any suitable criterion. For example, a mobility entity associated with the nearest gateway node may be selected in order to optimize the routing of the macro layer traffic. Another criterion may be a current loading of the mobility entities so that mobility entity with a light traffic load is preferred to heavily loaded mobility agents in order to distribute the traffic in the network. Selection may be based on mobility entity data stored in the access node, or on information or an overriding command received from another network element, or on a combination of these.

The checking of the macro mobility capability may be based on subscriber data stored in a subscriber data base or on information provided by said mobile station in said attach procedure. For example, the mobile station may indicate the Mobile IP capability in the attach request, e.g. by means of a Mobile Station Classmark. As a further example, the Mobile IP capability may be checked by interrogating a home subscriber data base. Generally, the checking includes all measures which indicate the Mobile IP capability of the mobile station to the access node.

One of the benefits of the invention is that the mobile station does not need to know the mobility agents beforehand but it is informed of a suitable one when accessing the network. A further advantage of the invention is that the new inventive functionality at the access node enables to detect the need for a mobility entity, to select the most optimal mobility entity in each part of the network and to change it, without any non-standard signalling or procedure being needed in other elements of the packet radio network or on the Mobile IP level. The optimal selection of the mobility entity may further result in more optimal routing which allows transmission mobility entity resources to be saved or used more effectively in the packet radio system, and possibly also to make the connection faster as the connection leg between the access node and the mobility entity is shorter.

BRIEF DESCRIPTION OF THE DRAWINGS

In the following, the invention will be described in greater detail by means of preferred embodiments with reference to the accompanying drawings, in which.

PREFERRED EMBODIMENTS OF THE INVENTION

The present invention can be applied to any packet mode communications requiring a macro mobility management which overlays the mobility management of an access network. The invention is especially well suited for supporting a Mobile IP type mobility management in an access network. The access network may be any access network, such as a radio access network. The invention can be particularly preferably used for providing a general packet radio service GPRS in the pan-European digital mobile communication system GSM (Global System for Mobile Communication) or in corresponding mobile communication systems, such as DCS1800 and PCS (Personal Communication System), or in third generation (3G) mobile systems, such as UMTS, implementing a GPRS-type packet radio. In the following, the preferred embodiments of the invention will be described with reference to a GPRS packet radio network formed by the GPRS service and the 3G or GSM system, without limiting the invention to this particular packet access system.

Figure 1:
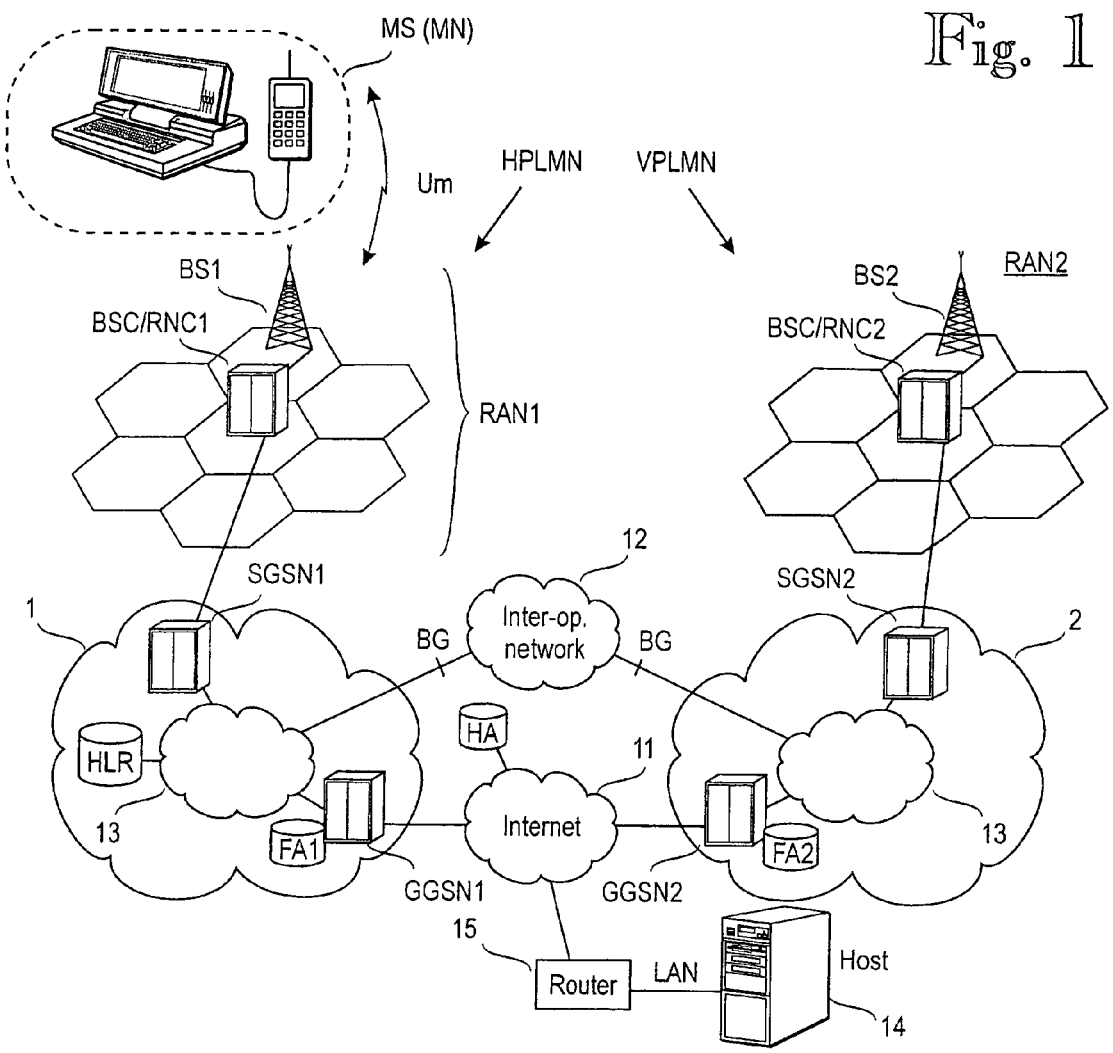
FIG. 1 illustrates GPRS network architecture.
Figure 2:
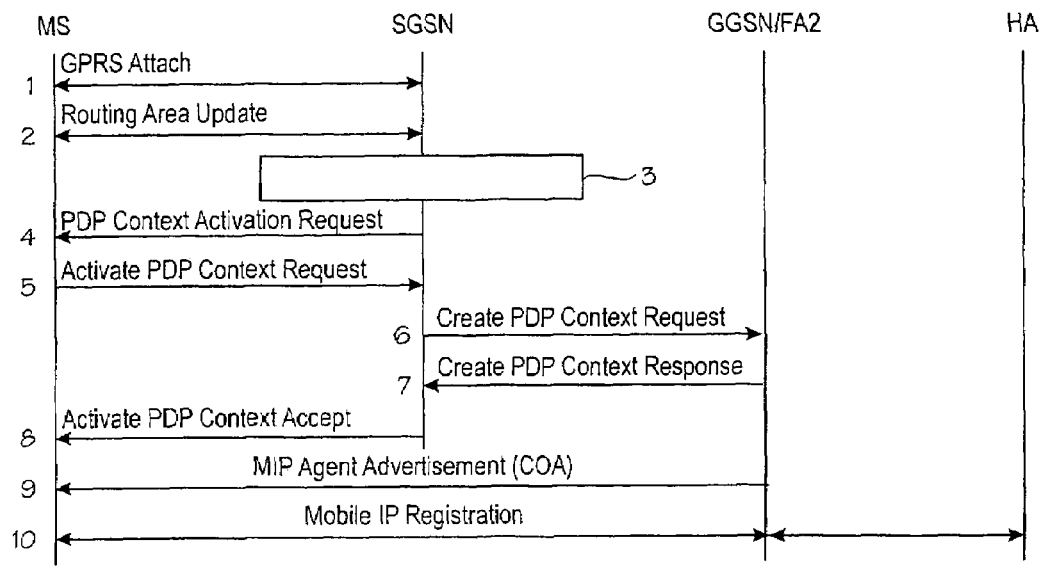
FIG. 2 is a signalling diagram illustrating the method according to the invention.

A GPRS architecture utilizing 3G radio access (such as UMTS) or 2G radio access (such as GSM) is illustrated in FIG. 1. The GPRS infrastructure comprises support nodes such as a GPRS gateway support node (GGSN) and a GPRS serving support node (SGSN). The main functions of the GGSN nodes involve interaction with an external data network. The GGSN updates a location directory using routing information supplied by the SGSNs about an MS's path and routes the encapsulated external data network protocol packet over the GPRS backbone to the SGSN currently serving the MS. It also decapsulates and forwards external data network packets to the appropriate data networks and handles the billing of data traffic.

The main functions of the SGSN are to detect new GPRS mobile stations in its service area, to handle the process of registering the new MSs along with the GPRS registers, to send/receive data packets to/from the GPRS MS, and to keep a record of the location of the MSs within its service area. The subscription information is stored in a GPRS register (HLR) where the mapping between a mobile's identity (such as MS-ISDN or IMSI) and the PSPDN address is stored. The GPRS register serves as a database from which the SGSNs can ask whether a new MS in its area is allowed to join the GPRS network.

The GPRS gateway support nodes GGSN connect an operator's GPRS network to external systems, such as other operators' GPRS systems, to data networks 11, such as an IP network (Internet) or an X.25 network, and to service centres. Fixed hosts 14 can be connected to the data network 11 e.g. through a local area network LAN and a router 15. A border gateway BG provides access to an inter-operator GPRS backbone network 12. The GGSN may also be connected directly to a private corporate network or a host. The GGSN includes GPRS subscribers' PDP addresses and routing information, i.e. SGSN addresses. Routing information is used for tunnelling protocol data units PDU from the data network 11 to the current switching point of the MS, i.e. to the serving SGSN. The functionalities of the SGSN and GGSN can be connected to the same physical node (SGSN+GGSN).

The home location register HLR of the GSM network contains GPRS subscriber data and routing information, and it maps the subscriber's IMSI into one or more pairs of the PDP type and PDP address. The HLR also maps each PDP type and PDP address pair into a GGSN node. The SGSN has a Gr interface to the HLR (a direct signalling connection or via an internal backbone network 13). The HLR of a roaming MS and its serving SGSN may be in different mobile communication networks.

The intra-operator backbone network 13, which interconnects an operator's SGSN and GGSN equipment can be implemented, for example, by means of a local network, such as an IP network. It should be noted that an operator's GPRS network can also be implemented without the intra-operator backbone network, e.g. by providing all features in one computer.

Network access provides the means for connecting a user to a telecommunication network in order to use the services and/or facilities of that network. An access protocol is a defined set of procedures that enables the user to employ the services and/or facilities of the network. The SGSN, which is at the same hierarchical level as the mobile switching centre MSC, keeps track of the individual MSs' locations and performs security functions and access control. GPRS security functionality is equivalent to the existing GSM security. The SGSN performs authentication and cipher setting procedures based on the same algorithms, keys, and criteria as in the existing GSM. The GPRS uses a ciphering algorithm optimised for packet data transmission.

In order to access the GPRS services, an MS shall first make its presence known to the network by performing a GPRS attach. This operation establishes a logical link between the MS and the SGSN, and makes the MS available for the SMS over the GPRS, for paging via the SGSN, and for notification of incoming GPRS data. More particularly, when the MS attaches to the GPRS network, i.e. in a GPRS attach procedure, the SGSN creates a mobility management context (MM context), and a logical link LLC (Logical Link Control) is established between the MS and the SGSN in a protocol layer. MM contexts are stored in the SGSN and MS. The MM context of the SGSN may contain subscriber data, such as the subscriber's IMSI, TLLI and location and routing information, etc.

In order to send and receive GPRS data, the MS shall activate the packet data address that it wants to use by requesting a PDP activation procedure. This operation makes the MS known in the corresponding GGSN, and interworking with external data networks can commence. More particularly, one or more PDP contexts are created in the MS, the GGSN and the SGSN, and stored in the serving SGSN in connection with the MM context. The PDP context defines different data transmission parameters, such as the PDP type (e.g. X.25 or IP), PDP address (e.g. IP address), quality of service QoS and NSAPI (Network Service Access Point Identifier). The MS activates the PDU context with a specific message, Activate PDP Context Request, in which it gives information on the TLLI, PDP type, PDP address, the required QoS and NSAPI, and optionally the access point name APN. The SGSN sends a Create PDP Context message to the GGSN which creates the PDP context and sends it to the SGSN. The SGSN sends the PDP context to MS in an Activate PDP Context Response message, and a virtual connection or link between the MS and the GGSN is established. As a result, the SGSN forwards all the data packets from the MS to the GGSN, and the GGSN forwards to the SGSN all data packets received form the external network and addressed to the MS. The PDP context is stored in the MS, the SGSN and the GGSN. When the MS roams to the area of a new SGSN, the new SGSN requests MM and PDP contexts from the old SGSN.

FIG. 1 illustrates the implementation of a Mobile IP in the GPRS/3G environment.

The MS can be a laptop computer PC connected to a cellular telephone enabling packet radio transmission. Alternatively, the MS can be an integrated combination of a small computer and a packet radio telephone, similar in appearance to the Nokia Communicator 9000 series. Yet further embodiments of the MS include various pagers, remote-control, surveillance and/or data-acquisition devices, etc. The user of a mobile station MS subscribes to a special Mobile IP service. The subscription information is stored in the Home Location Register HLR together with the user's home IP address.

In FIG. 1 the foreign agents FA are located at (integrated into) GGSN'S. An alternative is that the SGSN and the GGSN are co-located, and the FAs are located at SGSN+GGSNs. It should be noted that there may be more than one SGSN and GGSN in one network. All GGSNs may not have FAs. Each FA has an IP address in the Internet and in the operator's own private GPRS/3G backbone network. More precisely, the FA's IP address is such that IP packets destined to that address are routed in the Internet to the GGSN associated with the FA. When the MN leaves its home subnet and registers to a new FA, it can no longer be reached on the basis of its home IP address alone, but must be assigned an address belonging to the visited network, called the care-of address (COA). The care-of address positively identifies the instantaneous location of the mobile terminal and may be: 1) the IP address of the FA belonging to the visited network, or 2) an IP address acquired directly by the mobile terminal through an autoconfiguration mechanism from the local IP address space, in which case the term co-located care-of address is used. Upon registering to a new FA and obtaining a COA, the MN then registers with a home agent HA in its home network and informs the latter of its COA. In FIG. 1 a home agent HA is located in the data network 11 which is the home network of the mobile node MN associated with the mobile station MS. A second host 14 wishing to communicate with the MN need not know that the MN has moved: it simply sends IP packets addressed to the MN's home IP address. These packets are routed via normal IP routing to the MN's home network, there they are intercepted by the HA. The HA encapsulates each such packet into another IP packet which contains the MN's COA as these packets are thus delivered to the FA (a process called tunneling). The FA forwards the IP packet to the GGSN. The GGSN forwards the IP packet (which may be encapsulated for transmission over the GPRS backbone) to the serving SGSN which further forwards the IP packet to the MS/MN. Packets from the MN to the second host 14 need not necessarily be tunneled: the MN may simply send them to the GGSN which directly forwards the packets to the second host 14, without interception by the FA or the HA.

As noted above, according to the present invention the SGSN selects the mobility agent and indicates it to the mobile station during the GPRS attach. A preferred embodiment of the invention will be now described with reference to FIGS. 1, 2, 3 and 4.

A reference is now made to FIG. 1. The home network of the mobile station MS is the GPRS/3G network 1. The user of the mobile station MS subscribes to a special Mobile IP service, and an IP application in the MS or in a separate data terminal is a mobile node MN in the Mobile IP communication.

Let us now assume that the MS/MN is located in the service area of another GPRS/3G network 2 which is served by a support node SGSN2. The MS part listens to radio broadcast messages, which contain information about radio parameters, network and cell identity, etc. as well as e.g. information about available core network, service providers, service capabilities etc. Then the MS sends a GPRS attach request to the SGSN2, as shown in step 1 in FIG. 2. The SGSN2 creates a mobility management context (MM context), and a logical link LLC (Logical Link Control) is established between the MS and the SGSN in a protocol layer. MM contexts are stored in the SGSN and MS. The MM context of the SGSN may contain subscriber data, such as the subscriber's IMSI, TLLI and location and routing information, etc. The authentication, ciphering and location updating procedures, as well as an interrogation to the HLR of the MS/MN in order to obtain the subscriber data, may typically be involved with the creation of the MM context, as shown in steps 2. In the preferred embodiments the procedures involved in steps 1 and 2 are in accordance with the basic GPRS attach defined in the current GPRS/UMTS specifications.

During the GPRS attach procedure, preferably after the MM context is created, the SGSN2 executes the Mobile IP capability check and the FA selection procedure according to the present invention, step 3.

Figure 3:
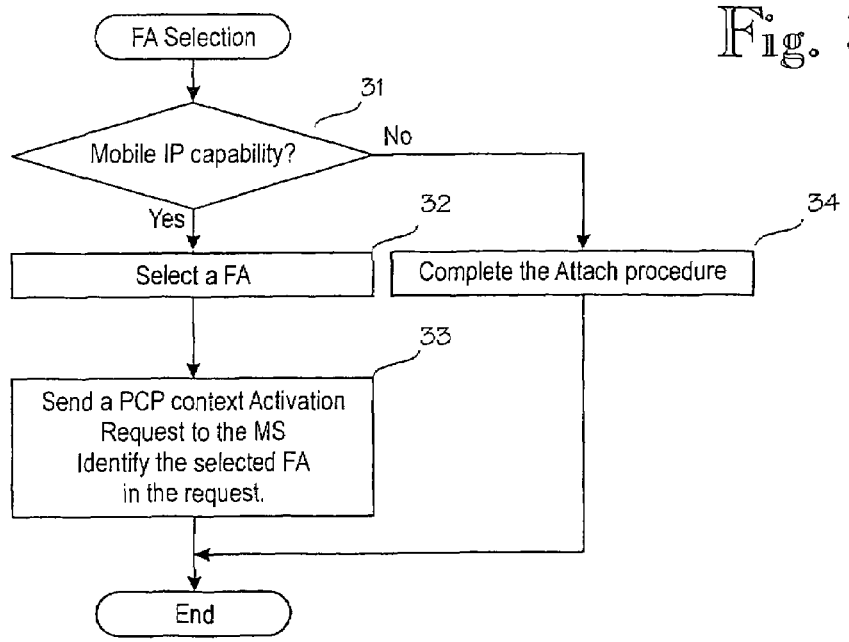
FIG. 3 is a flow diagram illustrating the function of a support node.

The check and selection procedure according to the preferred embodiment of the present invention is illustrated in FIG. 3.

In step 31 the SGSN2 checks whether the MS/MM has a Mobile IP capability. For example, the SGSN2 may check whether the subscriber data obtained from the HLR indicates that the mobile station MS subscribes to a special Mobile IP service. Alternatively or in addition, the SGSN2 may check whether the Mobile Station Classmark Information element received in the attached request message from the MS indicates that the MS has the Mobile IP capability. The Mobile Station Classmark Information element is used to indicate the general characteristics of the mobile station equipment to the network in order to affect the manner in which the network handles the operation of the mobile station. If the Mobile IP capability is indicated in the classmark, this can be utilized in the present invention. However, it should be noted that the recognition of the Mobile IP capability can be based on any information received from the MS, another network element (such as HLR) or stored locally in the SGSN2.

If the Mobile IP capability of the MS is found in step 31, the SGSN2 selects a suitable foreign agent (FA) for the MS, step 32. The selection of the mobile agent may be based on any suitable criterion. For example, the address of the FA associated with the nearest GGSN, i.e. a FA2 at the GGSN2, may be stored in SGSN2 for selection purposes. In that case, the SGSN2 may always select the FA2. Normally this approach also provides the most optimal routing, i.e. minimizes the length of the routing path through the network. In another embodiment of the invention, the selection is based on the traffic load at the foreign agents FA1 and FA2. The traffic load may be monitored by the operation and maintenance center AMC of the network (not shown) and informed to the SGSN2. The SGSN2 may select the FA2, if the traffic load at the FA2 is below a predetermined threshold, and select another FA having a lower traffic load, if the traffic load at the FA2 exceeds the threshold. Also other criteria are apparent to a person skilled in the art, depending on the system parameters which are to be considered in the selection. It is also possible that another network element, such as the OMC, commands the SGSN to select a specific FA, for example based on the above mentioned criteria.

After selecting the FA, the SGSN2 sends to the MS a Request PDP Context Activation message which requests the MS to initiate activation of a PDP context. In the preferred embodiment of the invention, the request message includes the IP address of the FA and information that the address is a FA address. The FA information may be included in the Request PDP Context Activation message by using the offered PDP address information field. In the offered PDP context address information field, as currently defined, there are spare bits that could carry the information that the PDP address in the field is a FA address. However, it should be noted that any other information field, an additional information field, another message, or a dedicated message may be employed for carrying the FA information according to the present invention. Another example of existing messages that could be used for this purpose is the GPRS attach acknowledgement. It should also be noted that the exact point during the GPRS attach procedure when the IP capability check and the FA selection is carried out may differ from the point shown in FIG. 2, without departing from the basic principles of the invention.

If no mobile IP capability is found in step 31, the SGSN2 completes the GPRS attach procedure as defined in the current GPRS/UMTS specifications (step 34).

Referring again to FIG. 2, the SGSN sends the Request PDP Context Activation message as described above (step 4). If the MS is really ready to use the Mobile IP (e.g. the MS has a laptop computer with the Mobile IP application software connected), the MS immediately sends to the SGSN2 the Activate PDP Context Request message containing the FA address in the requested PDP address field. The SGSN2 creates a PDP context in the GGSN/FA2 by sending a Create PDP Context request to the GGSN/FA2 (step 6 in FIG. 2). The GGSN/FA2 creates the PDP context for the MS/MN and returns a Create PDP Context response to the SGSN2 (step 7 in FIG. 2). The SGSN2 establishes the PDP Context for the MS/MN, and responds to the MS/MN with the Activate PDP Context Accept message (step 8 in FIG. 2). Thus, a virtual connection has been established between the MS/MN and the GGSN/FA2.

All the previous procedures have been executed in the GPRS/3G layer only. The overlaying Mobile IP layer, and thereby the MS part of the MS/MN, need not be aware of the selection of the FA according to the present invention. However, due to the connection established to the GGSN/FA2, the MN is now able to receive the agent advertisement messages broadcasted by the FA2 in accordance with the Mobile IP protocol. The agent advertisement message may also include the care-of-address COA, or the MN may obtain the COA in accordance with the MIP standard. The mobile node MN then registers its COA with its home agent HA in accordance with the MIP standard (step 10 in FIG. 2). Depending on its method of attachment, the MS will register either directly with its HA, or through the FA2 which forwards the registration to the HA. Thereafter, the Mobile IP tunneling between the HA and the GGSN/FA2 is established, in accordance with the Mobile IP standard.

As a result, the selection of the correct FA and the foreign agent advertisement can be established using standard GPRS/3G procedures and messages as standard Mobile IP procedures and messages everywhere else but in the SGSN2, and possibly in the MS. Also in the SGSN2 only minor modifications are needed.

The description only illustrates preferred embodiments of the invention. The invention is not, however, limited to these examples, but it may vary within the scope and spirit of the appended claims.

What is claimed is:

1. A method of indicating a macro mobility entity in an access system comprising a plurality of mobile stations, access nodes, and at least one mobility entity arranged to provide macro mobility management services to the mobile stations while registered to the access system, said method comprising
   initiating an attach procedure to one of said access nodes by a mobile station,
   reacting to said mobile station having IP capability by
      initiating at said access node a selection of a macro mobility entity for said mobile station, and
      sending the identity of said selected macro mobility entity to said mobile station in association with an access context establishment.

2. A method according to claim 1, comprising sending to said mobile station a request to initiate activation of a packet protocol context for said mobile station in said access system.

3. A method according to claim 1, comprising checking at said access node, in response to said initiation of the attach procedure, whether said mobile station has macro mobility capability.

4. A method according to claim 1, comprising sending the identity of said selected mobility entity to said mobile station in said request.

5. A method according to claim 1, comprising initiating an activation of the packet protocol context by said mobile station having an associated mobile node in order set up a connection to said selected mobility entity, if a registration according to the macro mobility management is desired.

6. A method according to claim 1, comprising
   said macro mobility management being Mobile IP type mobility management, and
   sending an agent advertisement message from said selected mobility agent to said mobile node over said connection, said agent advertisement message enabling said mobile node to initiate Mobile IP registration.

7. A method according to claim 1, comprising checking said macro mobility capability of said mobile station on the basis of subscriber data stored in a subscriber data base or information provided by said mobile station in said attach procedure.

8. A method according to claim 7, wherein said macro mobility capability is indicated by a classmark information of said mobile station.

9. A method according to claim 1 or 7, wherein selected mobility entity is a foreign agent associated with one of said gateway nodes in said packet access network.

10. A method according to claim 1 or 7, wherein said identity includes a mobile entity address.

11. A method according to claim 1 or 7, wherein the access system is a radio system, such as GPRS or UMTS.

12. A packet access system, comprising
   a plurality of mobile stations, at least some of said mobile stations supporting macro layer mobility,
   access nodes,
   at least one mobility entity arranged to provide macro mobility management services,
   said access nodes being responsive to said mobile station having the macro mobility capability to
      initiate a selection of a macro mobility entity for said mobile station, and
      send an identity of said selected macro mobility entity to said mobile station.

13. A system according to claim 12, wherein said access nodes are responsive to said mobile station having the macro mobility capability to initiate activation of a packet protocol context for said mobile station in said access system.

14. A system according to claim 12 or 13, wherein said access nodes are responsive to an attach request received from a mobile station to check whether the mobile station has macro mobility capability.

15. A system according to claim 12, wherein said access node sends the identity of said selected mobility entity to said mobile station in said request.

16. A system according to claim 12, wherein said mobile station, when having an associated mobile node and desiring a macro mobility registration, is arranged to initiate activation of the packet protocol context in order set up a connection to said selected mobility entity according to said identity.

17. A system according to claim 12, wherein said access nodes are arranged to check said macro mobility capability of said mobile station on the basis of subscriber data stored in a subscriber data base or information provided by said mobile station in said attach procedure.

18. An access node for a packet access system comprising a plurality of mobile stations, at least some of said mobile stations supporting macro mobility, access nodes serving said mobile stations within respective parts of the packet access system, and at least two macro mobility entities being arranged to provide macro mobility management services to the mobile stations while registered to the access system, said access node comprising means, responsive to said mobile station having the macro mobility capability, for selecting at said access node a macro mobility entity for said mobile station, and for sending an identity of said selected macro mobility entity to said mobile station in association with an access context establishment.

19. An access node according to claim 18, comprising means for checking whether a mobile station accessing the system via said access node has macro mobility capability.

20. A system according to claim 12, wherein said macro layer mobility is Mobile Internet Protocol.

* * * * *